United States Patent
Hilton, Sr.

[11] Patent Number: 5,194,985
[45] Date of Patent: Mar. 16, 1993

[54] PROTECTED AIRBORNE WINDOW FOR INFRARED RADIATION AND METHOD OF MAKING SAME

[75] Inventor: Albert R. Hilton, Sr., Richardson, Tex.

[73] Assignee: Amorphous Materials, Inc., Garland, Tex.

[21] Appl. No.: 928,749

[22] Filed: Aug. 13, 1992

Related U.S. Application Data

[63] Continuation of Ser. No. 545,548, Jun. 29, 1990, abandoned.

[51] Int. Cl.⁵ .......................... G02B 1/10; G02B 5/20
[52] U.S. Cl. .................................. 359/350; 219/203; 359/359
[58] Field of Search ............... 359/350, 352, 359, 360, 359/589; 351/166; 219/203

[56] References Cited

U.S. PATENT DOCUMENTS

| | | | |
|---|---|---|---|
| 3,743,847 | 7/1973 | Boland | 359/359 |
| 4,512,638 | 4/1985 | Sriram et al. | 359/352 |
| 4,778,731 | 10/1988 | Kraatz et al. | 359/359 |
| 4,826,266 | 5/1989 | Baird et al. | 359/359 |

Primary Examiner—Martin Lerner
Attorney, Agent, or Firm—Jack A. Kanz

[57] ABSTRACT

An external window for infrared radiation is protected from hostile environments by forming a bulk window of gallium arsenide and depositing a protective layer of silicon on the external surface. A grid-like pattern of conductive lines is formed in the silicon layer to provide a heated de-icer and to act as a shield against longer wavelength electromagnetic radiation.

10 Claims, 1 Drawing Sheet

PROTECTED AIRBORNE WINDOW FOR INFRARED RADIATION AND METHOD OF MAKING SAME

FIELD OF THE INVENTION

This is a continuation of Application Ser. No. 07/545,548 entitled Protected Window for Infrared Radiation and Method of Making Same filed Jun. 29, 1990, now abandoned.

This invention relates to materials and methods for fabricating airborne windows which transmit infrared radiation. More particularly, it relates to infrared transmitting windows which are protected from hostile environments which may cause abrasion, oxidation or icing and methods for making such windows.

BACKGROUND OF THE INVENTION

Various systems employ sensing devices which are extremely sensitive to infrared radiation. However, in many situations the system and infrared sensors must be maintained in a protected environment and the infrared energy admitted to the protected environment through an external window. Typical of such situations is an airborne system wherein the sensors are located in an airplane and infrared energy is sensed through an external window.

Not only must the window possess sufficient physical strength to withstand rapidly changing pressure and temperature differentials, the external surface of the window must withstand abrasion by rain, air and dust. Furthermore, in order to permit all-weather operation, means must be provided to prevent the formation of ice on the window and, for military applications, the window must provide a shield against longer wavelength electromagnetic radiation such as radar and radio.

Compositions of zinc selenide/zinc sulfide are currently used as infrared windows because they are substantially transparent to infrared wavelengths and can be formed into bodies having sufficient physical strength to withstand the pressure differentials required for airborne windows. Other materials such as germanium and gallium arsenide have been proposed for use as external windows since these materials are substantially more transparent in the long infrared (6–5 $\mu$m) than the zinc selenide/zinc sulfide compositions. However, all these materials are prone to erosion and abrasion from the atmospheric conditions encountered and are transparent to most radar and radio wavelengths. Thus, unless special shielding is provided, they do not shield the aircraft interior from longer wavelength penetration. Furthermore, most prior window materials cannot be provided with de-icing capabilities without seriously affecting their performance as windows for infrared radiation.

SUMMARY OF THE INVENTION

In accordance with the present invention, a window is provided which not only is substantially transparent to infrared and possesses the required physical strength for use as an external window, it is provided with an external surface which is resistant to environmental erosion and oxidation and incorporates de-icing capabilities as well as shielding against longer wavelength electromagnetic radiation. The window comprises a body of gallium arsenide formed in the shape of the desired window with a layer of silicon formed on the major face thereof which corresponds to the outer surface of the window exposed to hostile conditions. A grid-like pattern formed in the silicon layer is connected to a current source to provide a resistance heater for the prevention of ice formation on the window. The grid-like pattern is preferably formed from crossed sets of parallel lines randomly spaced to provide a shield against longer wavelength electromagnetic radiation. Windows formed in accordance with the invention thus have physical strength superior to that exhibited by conventional zinc selenide/zinc sulfide compositions and are more transparent to infrared radiation. Furthermore, the external surfaces of the windows of the invention are much harder and more resistant to rain, wind and dust erosion than any such windows previously used. Other features and advantages of the invention will become more readily understood from the following detailed description taken in connection with the appended claims and attached drawing in which:

DESCRIPTION OF THE PREFERRED EMBODIMENTS

External windows for airborne infrared systems vary in size according to the host aircraft, the system and the particular application. Windows as large as eighteen inches by twelve inches are sometimes required. Gallium arsenide plates can be formed in the dimensions required by re-melting gallium arsenide formed by any conventional method in a suitable forming mold under conventional re-melting conditions which prevent contamination and loss of arsenic. Processes for forming such bulk plates are well-known and form no part of this invention.

The size and thickness of the bulk plate may vary, of course, depending on the physical requirements of the specific window to be formed. A bulk plate as large as eighteen inches long may be as thick as one-half to three-fourths inches. However, to minimize absorption the thickness of the plate should be no more than required to provide the required structural characteristics.

Infrared absorption in gallium arsenide is dependant upon purity and temperature of the gallium arsenide. For purposes of this invention, semi-insulating gallium arsenide is preferred since this material has a very low coefficient of absorption in the 8 $\mu$m to 12 $\mu$m wavelength range at temperatures as high as 500° C.

The bulk plate may be polished as desired to provide the required surface planarity and finish. A layer of silicon is then formed on the major face thereof which will be the external surface of the window. Polycrystalline silicon may be grown on gallium arsenide by conventional epitaxial techniques to provide a surface layer of the desired thickness and material characteristics.

One purpose for the silicon layer is to provide an external surface which is more resistant to hostile conditions than gallium arsenide. Silicon, being harder than gallium arsenide, is suitable for this purpose and may be readily formed on gallium arsenide by epitaxial techniques. However, silicon is sufficiently absorptive in the 8–12 $\mu$m region to attenuate the infrared energy unless a relatively thin layer is used. In the preferred embodiment, an un-doped silicon layer of from about one hundred twenty-five microns to about seven hundred microns (approximately 5 mils to about 30 mils) thick is sufficient to provide a hard protective coating for the bulk plate and causes an acceptably low transmission loss. In applications where icing conditions are not expected and longer wavelength shielding is not required, a gallium arsenide bulk window protected by an epitaxial layer of silicon is sufficient. To satisfy these conditions, even thinner layers of silicon may be acceptable.

Figure 1:
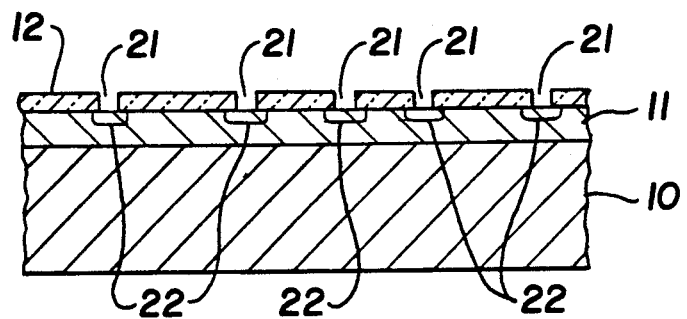
FIG. 1 is a fragmentary sectional view of the preferred embodiment of the window of the invention pattern in the outer surface thereof.

The window is provided with both a longer wavelength resistance shield and a de-icing heater by incorporation of a grid-like pattern of electrically conductive paths in the silicon layer. As illustrated in FIG. 1, a layer of silicon is epitaxially grown on one surface of a bulk plate 10 of gallium arsenide. A layer 12 of SiO₂ is then formed on the surface of the silicon layer 11. Using conventional photo-masking techniques, a grid-like pattern of SiO₂ is removed to form a grid-like pattern of channels 21 in the SiO₂ layer through which the surface of the silicon layer 11 is exposed. A suitable dopant is then diffused into the exposed silicon surface to form a corresponding grid-like pattern of conductive lines 22 in the silicon layer 11. The doping concentration of the diffused lines 22 should be sufficient to provide electrical conductivity and the cross-sectional area of each diffused line 22 should be sufficient so that each diffused line 22, when electrical current is passed therethrough, becomes a resistance heating element. Interconnection of the diffused lines 22 and an external source of electrical current can be accomplished, of course, by any of a variety of conventional techniques.

After the grid-like pattern of lines 22 has been formed, the SiO₂ layer is removed. The external surface is thus smooth and devoid of any physical lines or patterns. If desired, an anti-reflective coating or other conventional surface treatment may be applied directly to the surface of the silicon layer 11.

It is preferred that the grid-like pattern of lines 22 be formed by diffusion as discussed above because the diffused lines remain somewhat transparent to infrared and the surface of the silicon remains smooth. Alternatively, however, the grid-like pattern of conductive lines 22 could be formed by depositing a suitable conductive material in the channels of the SiO₂ mask. As a further alternative, channels could be formed in the surface of the silicon by etching the silicon exposed through the SiO₂ mask and the etched channels re-filled with epitaxially grown conductive material or otherwise deposited conductive material.

Figure 2:
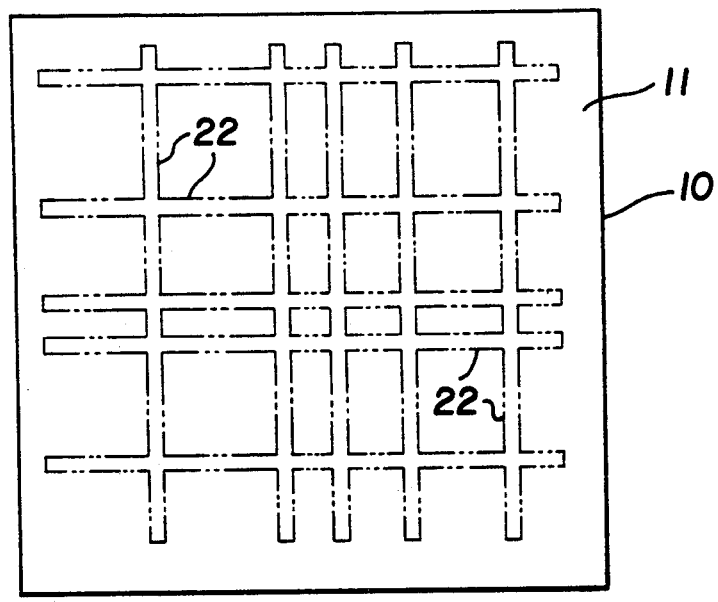
FIG. 2 is a top plan view of the window of FIGURE 1.

While the grid-like pattern 22 may be used as a resistance heater to prevent ice accumulation on the window, the pattern may also be used as a shield against longer wavelength electromagnetic radiation. In the preferred embodiment, the pattern is formed by arranging crossed sets of parallel lines with random spacings between the lines in each set as illustrated in FIGURE 2. This produces a grid of irregularly-sized rectangular openings in the plane of the surface of the window similar to a wire grid. The size and spacing of the individual lines, of course, will be determined by the wavelength of radiation to be shielded.

Although semi-insulating gallium arsenide is known to be more transparent in the 8 $\mu$m to 12 $\mu$m range than the zinc selenide/zinc sulfide compositions commonly used and even more transparent than germium, its use as an external window has not previously been accepted because of its sensitivity to rain erosion, etc. While silicon possesses the mechanical characteristics suitable for an external window, its absorption of energy in the 8 $\mu$m to 12 $\mu$m region makes it generally unacceptable as an external window. However, by placing a relatively thin layer of silicon on a bulk plate of gallium arsenide, the advantages of both materials can be utilized without suffering from their respective disadvantages. Even with a layer of silicon on its surface as described herein, a gallium arsenide window absorbs much less radiation in the 8 $\mu$m to 12 $\mu$m range than does an equivalent window of any of the prior window materials used or proposed. Furthermore, the composite window of the invention is much easier to manufacture and much more resistant to hostile environments.

While the invention has been described with reference to flat plate windows, it will be readily recognized that the principles of the invention are not so limited. Windows in the form of domes, lenses or other suitable shapes can readily be formed by forming the gallium arsenide bulk plate in the desired shape and growing an epitaxial layer of silicon on the external surface as described herein. It is to be understood, therefore, that although the invention has been described with particular reference to specific embodiments thereof, the forms of the invention shown and described in detail are to be taken as preferred embodiments thereof, and that various changes and modifications may be resorted to without departing from the spirit and scope of the invention as defined by the appended claims.

What is claimed:

1. A window for infrared radiation comprising:
   (a) a body of gallium arsenide having first and second opposite major faces;
   (b) a layer of undoped silicon formed on said first major face; and
   (c) a pattern of relatively low resistivity lines formed in said layer of undoped silicon.

2. A window as defined in claim 1 wherein said pattern is comprised of crossed sets of parallel lines with random spacings between the lines of at least one set.

3. A window as defined in claim 1 wherein said layer of silicon is from about one hundred twenty-five to about seven hundred microns thick.

4. A window as defined in claim 1 wherein said body of gallium arsenide is semi-insulating gallium arsenide.

5. A window for an airborne infrared system adapted to transmit infrared radiation in the eight to twelve micron range from a hostile environment external to the supporting aircraft to the interior of the supporting aircraft comprising:
   (a) a body of gallium arsenide having first and second opposite major faces adapted to form a window in an aircraft for transmitting infrared radiation in the eight to twelve micron range from the exterior of the aircraft to the interior of the aircraft with said first major face arranged to be exposed to the environment exterior of the aircraft;
   (b) a layer of silicon from about one hundred twenty-five to about seven hundred microns thick and substantially transparent to infrared radiation in the eight to twelve micron range formed on said first major face and protecting said first major face from the physical effects of the hostile environment exterior of the aircraft.

6. A window as defined in claim 5 wherein said body of gallium arsenide is semi-insulating gallium arsenide.

7. A window as defined in claim 5 wherein said silicon is undoped silicon.

8. A window as defined in claim 7 including a pattern of relatively low resistivity lines formed in said layer of undoped silicon.

9. A window as defined in claim 8 wherein said pattern is comprised of crossed sets of parallel lines with random spacings between the lines of at least one set.

10. The method of forming a window for infrared radiation comprising the steps of:

(a) forming a gallium arsenide bulk window body of desired shape and size;
(b) forming an epitaxial layer of silicon on at least one surface of said window body;
(c) forming a layer of $SiO_2$ on the surface of said silicon;
(d) exposing a grid-like pattern of lines on the surface of said silicon through said $SiO_2$ layer; and
(e) diffusing a dopant into the exposed grid-like pattern to form a substantially conforming grid-like pattern of electrically conductive lines in said layer of silicon.

* * * * *

UNITED STATES PATENT AND TRADEMARK OFFICE
CERTIFICATE OF CORRECTION

PATENT NO. : 5,194,985
DATED     : March 16, 1993
INVENTOR(S) : Albert R. Hilton, Sr.

It is certified that error appears in the above-identified patent and that said Letters Patent is hereby corrected as shown below:

Column 2, between line 22 and line 23, insert ---immediately following the formation of a conductive grid---

Signed and Sealed this

Twenty-eighth Day of December, 1993

Attest:

BRUCE LEHMAN

Attesting Officer    Commissioner of Patents and Trademarks